United States Patent [19]

Steinberg

[11] Patent Number: 4,585,266

[45] Date of Patent: Apr. 29, 1986

[54] MANURE SPREADER HAVING SHIFTABLE COVER

[75] Inventor: Richard G. Steinberg, Clintonville, Wis.

[73] Assignee: H & S Manufacturing Co., Inc., Marshfield, Wis.

[21] Appl. No.: 586,868

[22] Filed: Mar. 9, 1984

[51] Int. Cl.[4] ................. B60P 7/02; B65D 43/02; E05D 7/02

[52] U.S. Cl. ....................... 296/100; 296/101; 105/377; 160/188; 16/262; 220/331; 220/333

[58] Field of Search ............ 296/100, 101, 180; 49/382, 193; 105/281, 286, 377; 414/407; 16/261-263; 160/188; 220/331-333

[56] References Cited

U.S. PATENT DOCUMENTS

| 217,286 | 7/1879 | Hetfield | 105/253 |
|---|---|---|---|
| 770,775 | 9/1904 | Norris | 298/6 |
| 831,428 | 9/1906 | Guiry | 298/6 |
| 1,125,056 | 1/1915 | Buchanan | 105/377 |
| 1,267,793 | 5/1918 | Oliver | 296/108 |
| 1,325,957 | 12/1919 | Rude | 296/180 |
| 1,333,464 | 3/1920 | Christophersen | 105/377 |
| 1,347,174 | 7/1920 | Murphy | 105/377 |
| 1,462,996 | 7/1923 | Allen et al. | 296/180 |
| 1,940,444 | 12/1933 | Burgman | 296/107 |
| 2,086,091 | 7/1937 | Payette | 296/100 |
| 3,090,429 | 5/1963 | Kummerman | 160/188 |
| 3,211,122 | 10/1965 | Barlow | 160/188 |
| 3,215,191 | 11/1965 | Richter et al. | 160/188 |
| 3,294,154 | 12/1966 | Jerome | 160/188 |
| 3,833,255 | 9/1974 | Logue | 296/101 |
| 3,861,083 | 1/1975 | Goiot | 49/382 |
| 3,978,550 | 9/1976 | Brown | 16/261 |
| 4,268,084 | 5/1981 | Peters | 296/100 |

FOREIGN PATENT DOCUMENTS

| 8497 | 10/1955 | Fed. Rep. of Germany | 105/377 |
|---|---|---|---|
| 1467562 | 12/1966 | France | 160/188 |

Primary Examiner—Robert B. Reeves
Assistant Examiner—Dennis H. Pedder

[57] ABSTRACT

A shiftable cover for a manure spreader is provided that is easily shiftable between a closed position wherein the spillage of liquid and semiliquid manure from the spreader is inhibited, to an open position which allows for the direct top loading of the spreader. The cover includes a pair of hinged together shiftable plates and extensible piston and cylinder assemblies for shifting the plates between opened and closed positions within a minimum operating envelope. The plates are arranged so as to scrapingly engage the manure spreader top wall for self cleaning of the top wall and the cover during the shifting of the plates.

6 Claims, 15 Drawing Figures

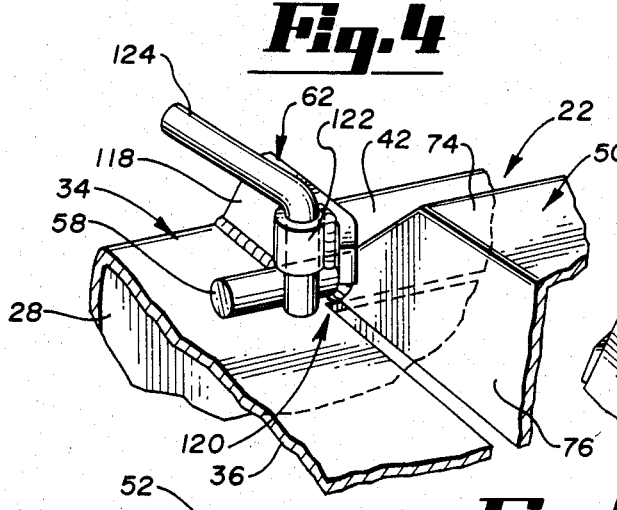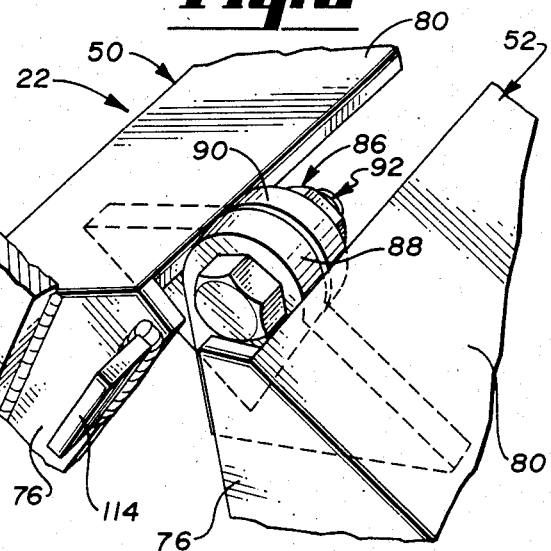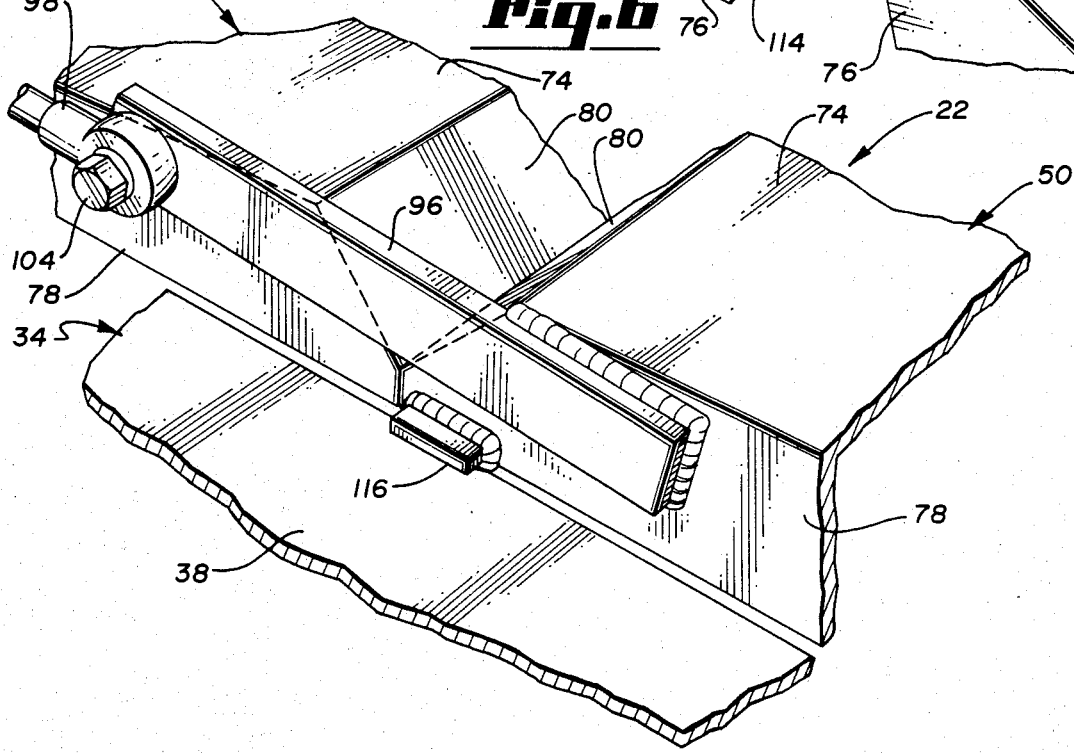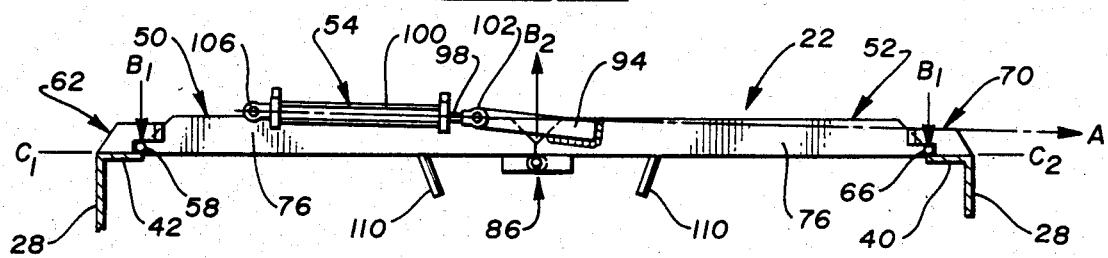

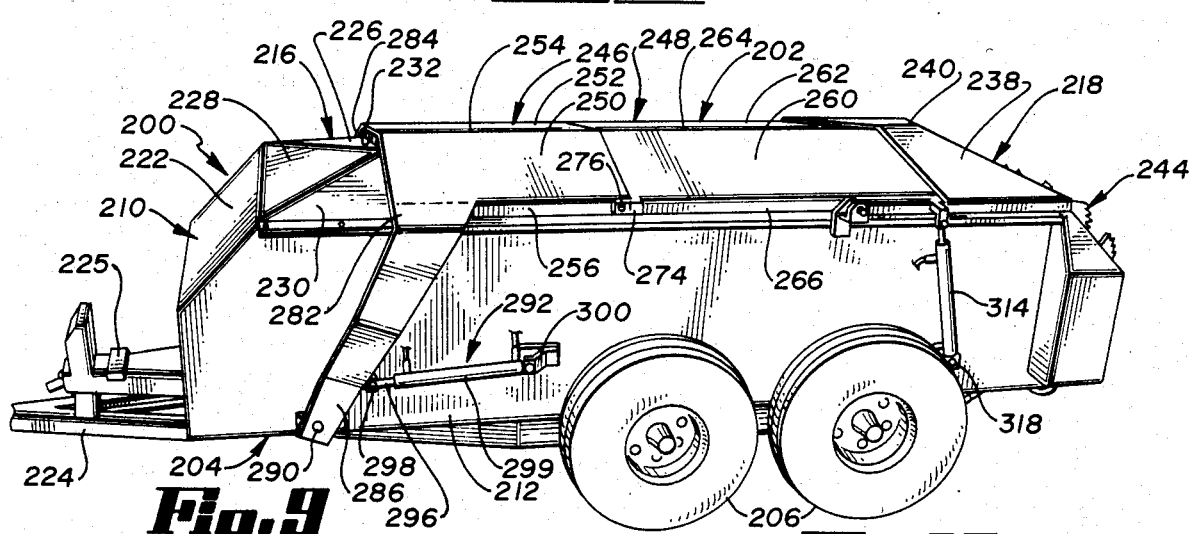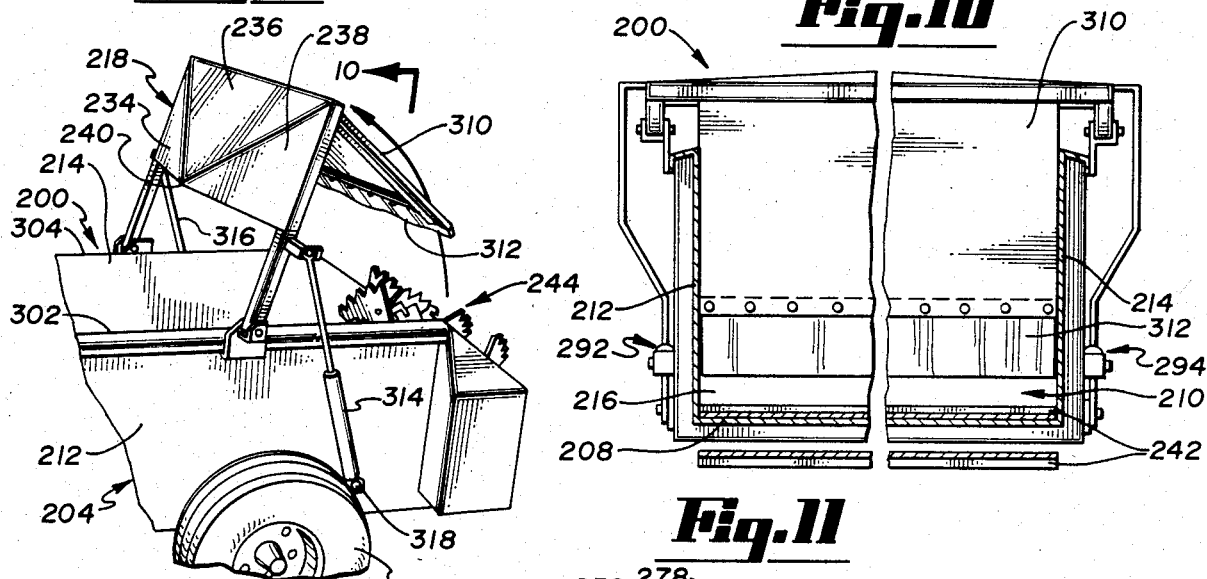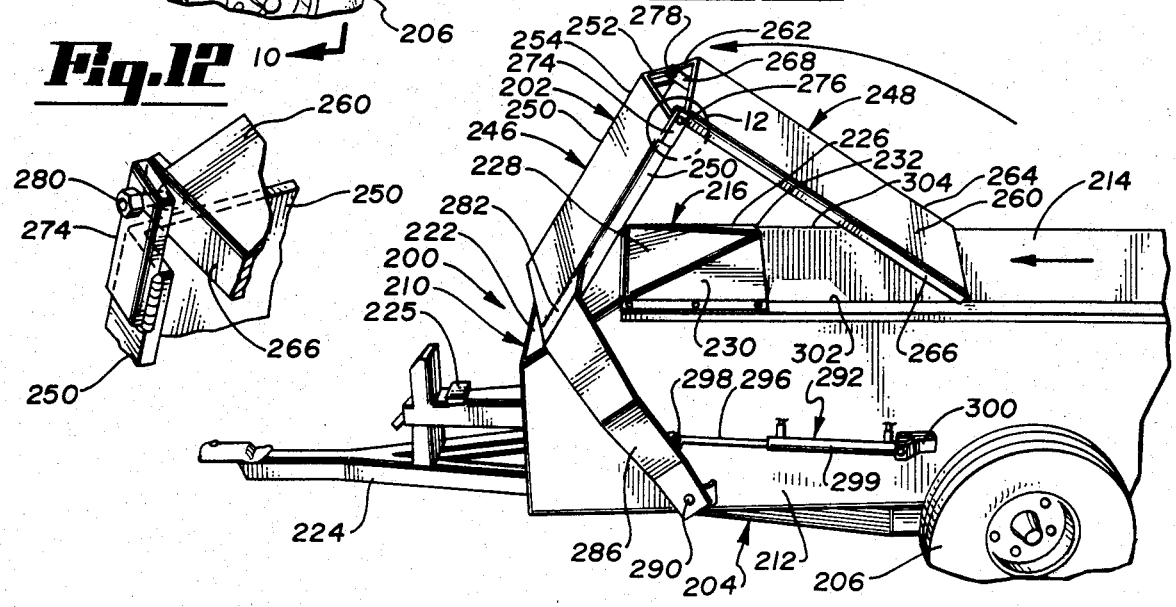

MANURE SPREADER HAVING SHIFTABLE COVER

TECHNICAL FIELD

This invention relates to farm equipment. In particular, it pertains to a manure spreader having a shiftable cover especially designed for the improved handling of liquid and semiliquid manure.

BACKGROUND

Recent trends in manure handling techniques have, for a variety of reasons, emphasized the collection of liquid and semiliquid manure. As in the past, the collected manure is preferably disposed of by distributing the manure as fertilizer over fields with a manure spreader.

Conventional manure spreaders typically include open faced top walls designed for the easy top loading of manure into the spreader. Transportation of liquid and semiliquid manure in such open faced spreaders, however, presents problems in that the liquid and semiliquid manure is prone to splashing and spillage out of the open top wall of the spreader.

A solution to the spillage problem of liquid and semiliquid manure from conventional top loaded manure spreaders would be to provide the spreaders with a top wall cover. Most farm facilities, however, provide for top loading of manure spreaders, and such a cover would be useful only if it did not interfere with direct top loading techniques. Moreover, any new design in manure handling equipment would have to be compatible with the limited space requirements of existing farm installations.

A cover for a manure spreader that would inhibit spillage of liquid and semiliquid manure from the spreader, but which could be shifted, within a minimum operating envelope, to a position that would allow for direct top loading of the spreader, would be a decided advantage.

SUMMARY OF THE INVENTION

The problems outlined above are in large measure solved by the shiftable manure spreader cover in accordance with the present invention. That is to say, the manure spreader cover hereof prevents spillage of liquid and semiliquid manure from a manure spreader, but is shiftable within a minimum operating envelope to allow for direct top loading of manure into the spreader. Moreover, the shiftable manure spreader cover in accordance with the present invention is inherently self cleaning.

The cover hereof includes a pair of hinged together shiftable top plates that are easily shifted between a closed, covered position and an open, loading position. Both side to side, and fore and aft shifting embodiments are disclosed.

BRIEF DESCRIPTION OF THE DRAWINGS

FIG. 4 is an enlarged, fragmentary, perspective view of a cover retaining bracket;

FIG. 5 is an enlarged, fragmentary, perspective view of a center hinge taken at 5 in FIG. 1;

FIG. 6 is an enlarged, fragmentary, perspective view of the cover in the closed position;

FIG. 7 is a fragmentary, sectional view of the manure spreader with the cover shown in the closed position;

FIG. 8 is a perspective view of a second manure spreader having a shiftable cover in accordance with a second embodiment of the present invention;

FIG. 9 is a fragmentary, perspective view of the rear portion of the manure spreader depicted in FIG. 8, with the discharge gate in the fully raised position;

FIG. 10 is a fragmentary, sectional view taken along the line 10—10 of FIG. 9, with certain parts omitted for clarity;

FIG. 11 is a fragmentary, perspective view of the front portion of the manure spreader depicted in FIG. 8, with the shiftable cover partially raised;

FIG. 12 is an enlarged, fragmentary, perspective view of a center hinge taken at 12 in FIG. 11;

DETAILED DESCRIPTION OF THE DRAWINGS

Figure 1:
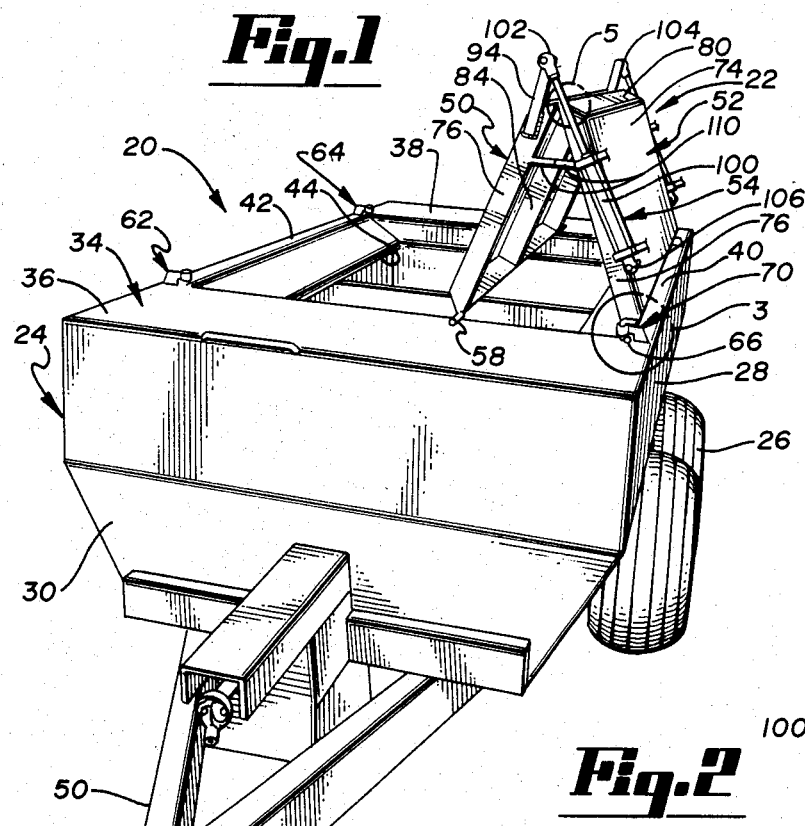
FIG. 1 is a perspective view of a manure spreader having a shiftable cover in accordance with the present invention, with the cover depicted in its open position.

Referring to FIGS. 1 through 7, a manure spreader 20 having a side to side shiftable cover 22 in accordance with a first embodiment of the present invention is depicted. A manure spreader 20 includes bin 24 supported by ground engaging wheels 26.

Bin 24 includes generally inclined side walls 28, front wall 30, rear wall 32, and top wall 34. Top wall 34 includes front and rear panels 36, 38, and side panels 40, 42 that together define top wall opening 44. Rear wall 32 includes shiftable gate 46 and manure distributing spinner 48. Hitch 50 extends forwardly from front wall 30.

Side to side cover 22 broadly includes hingeably connected, right and left cover plates 50, 52 and front and rear extensible piston and cylinder assemblies 54, 56. Right cover plate 50 includes opposed pivot pins 58, 60 that are selectively engageable by retaining brackets 62, 64. Likewise, left cover plate 52 includes pivot pins 66, 68 that are selectively engageable by retaining brackets 70, 72.

Each cover plate 50, 52 includes a top cover panel 74, front and rear, generally upright marginal edges 76, 78, and inboard and outboard, generally inclined lateral edges 80, 82. Each panel 74 of cover plate 50, 52 may include a strength rib 84.

The cover plates 50, 52 are hingeably connected at front hinge 86, and an identical (not shown) rear hinge. Referring in particular to FIG. 5, front hinge 86 includes first hinge bracket 88 fixedly connected to cover plate 52, and second hinge bracket 90 fixedly connected to cover plate 50. Hinge brackets 88, 90 are pivotally interconnected by nut and bolt assembly 92. Referring in particular to FIG. 7, the pivot axis defined by the front and rear hinges is positioned inboard of the cover 22 when the cover 22 is in the closed position.

Front and rear piston supporting arms 94, 96 are fixedly attached to cover plate 50. The arms 94, 96 extend generally upwardly from the cover plate 50, and beyond the inboard lateral edge 80 of plate 50. The pistons 98 of respective piston and cylinder assemblies 54, 56 are pivotally connected to respective front and rear supporting arms 94, 96 at pivot points 102, 104. The cylinders 100 of front and rear piston and cylinder assemblies 54, 56 are connected to the front and rear edges 76, 78 of plate 52 at pivot points 106, 108.

Each cover plate 50, 52 includes front and rear, downwardly extending struts 110, 112. Referring in particular to the phantom lines of FIG. 2, it will be seen that the rear struts 112 (and front struts 110, not shown in FIG. 2) of each plate 50, 52 are oriented so as to abutably engage when the cover 22 is in the opened position. More precisely, the struts 110, 112 define the fully opened position such that the piston and cylinder assemblies 54, 56 are prevented from going over center of the pivot axis defined by the front and rear center hinges 86.

Referring in particular to FIGS. 5 and 6, cover plate 50 includes front and rear, outwardly extending tabs 114, 116. As depicted in FIGS. 5 and 6, the front and rear upright edges 76, 78 of the cover plates are positioned inboard of the marginal edges of top wall front and rear panels 36, 38. Tabs 114, 116 are positioned to engage front and rear panels 36, 38 respectively of top wall 34, thereby providing support to cover plates 50, 52 when the cover 22 is in the closed position.

Figure 3:
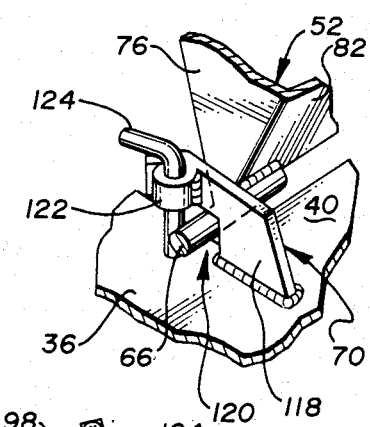
FIG. 3 is an enlarged, fragmentary, perspective view of a cover retaining bracket taken at 3 in FIG. 1.
Figure 2:
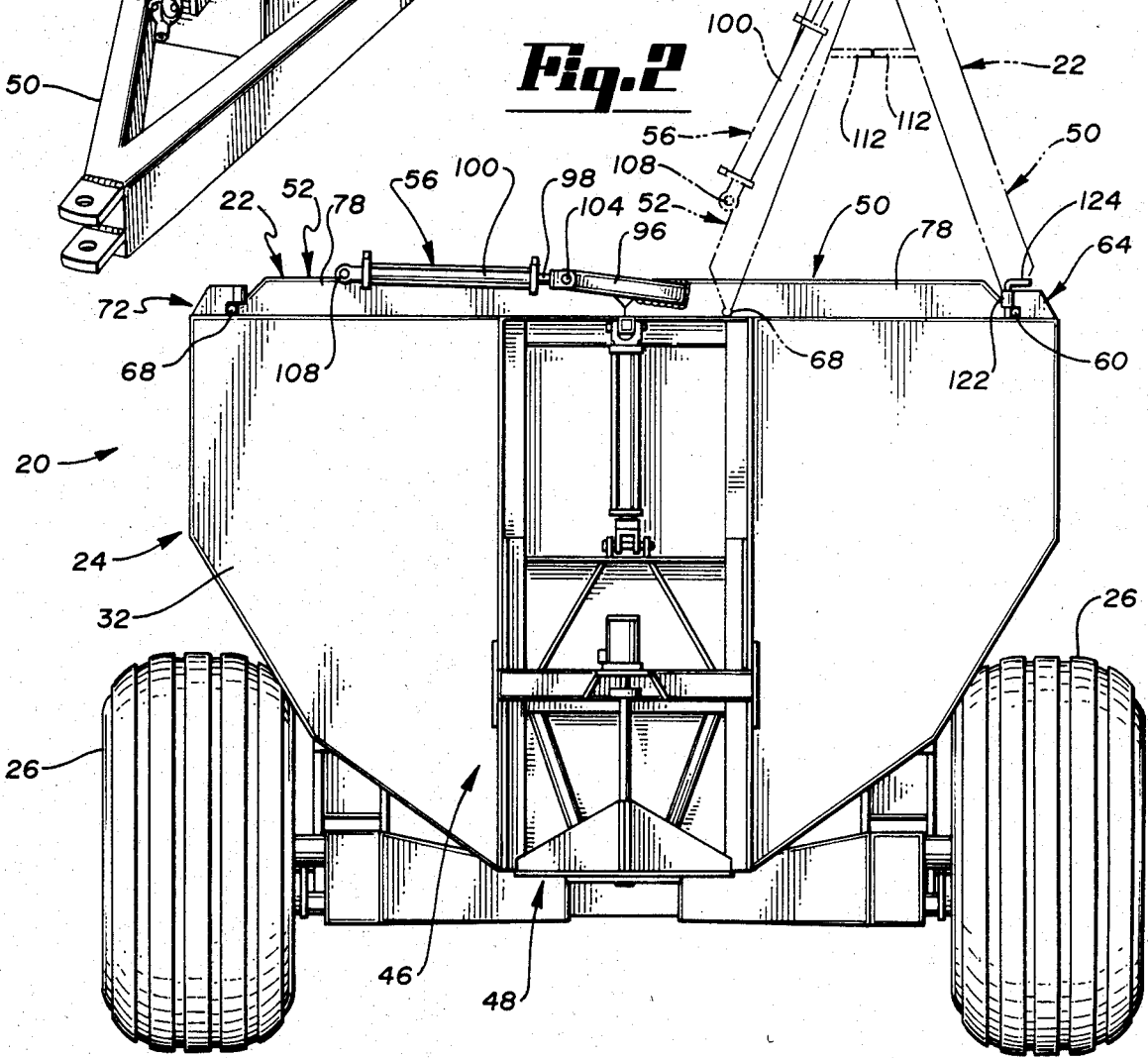
FIG. 2 is a rear elevational view of a manure spreader having a shiftable cover in accordance with the present invention, with the cover depicted in a closed position, and phantom lines depicting the cover in the open position.

The structure of the retaining brackets will now be described, with reference to FIGS. 3 and 4. Each retaining bracket includes a generally L-shaped upright support 118 fixedly connected to top wall 34. The supports 118, together with top wall 34 each define a pin retaining notch 120. The exposed end of each support 118 is flared outwardly away from the cover 22. A tubular shaped sleeve 122 is carried by each support 118. An L-shaped retainer pin 124 is removably carried by each sleeve 122.

Referring to FIGS. 8 through 15, a second manure spreader 200 with a fore and aft shiftable cover 202 in accordance with the present invention is depicted. The manure spreader 200 includes bin 204 supported by ground engaging wheels 206.

Bin 204 includes bottom wall 208, front wall 210, and side walls 212, 214. The bin top wall is defined by front panel 216 and shiftable, rear discharge gate 218. Rear gate 218 also defines the bin rear wall.

Front wall 210 includes a generally upright portion 220 and inclined portion 222. Hitch 224 extends forwardly from the front wall 210 and includes resilient pad 225. Top wall front panel 216 includes three inclined sections 226, 228, 230 that merge at apex 232. Similarly, rear gate 218 includes three sections 236, 238 that merge at apex 240.

Bottom wall 208 carries shiftable conveyor 242 (FIG. 10). A plurality of rotatable beaters 244 are provided at the rear end of bin 204.

Cover 202 includes front and rear plates 246, 248. Front plate 246 includes inclined top portions 250, 252 that intersect along top line 254, and generally upright lateral edges 256, 258. Likewise, rear plate 248 includes inclined portions 260, 262 that intersect along top line 264, and generally upright lateral edges 266, 268. The apexes 232, 240 and top lines 254, 264 are generally aligned along the bin center line. Both the front and rear plates may be provided with strength ribs such as those depicted at 270, 272 in conjunction with the front plate 246.

Referring in particular to FIG. 12, each of the front plate upright lateral edges 256, 258 is provided with a pivot arm 274. The pivot arms 274 are hingeably connected to rear plate 248 at pivot points 276, 278 respectively by individual nut and bolt assemblies 280, or other similar connecting devices. The pivot axis defined by the pivot points 276, 278 is positioned beneath the front and rear plate top lines 254, 264 when the cover 202 is in the closed position.

Front plate 246 includes outwardly extending ears 282, 284 at its forward edge. Support arms 286, 288 depend downwardly from respective ears 282 and 284, and are pivotally connected to the lower portions of respective bin side walls 212, 214 along pivot axis 290. The support arms 286, 288 are oriented so as to form an obtuse angle with the front cover plate marginal edges 256, 258. The support arms 286, 288 may be formed in nonaligned sections so as to easily clear obstructions mounted on the side walls 212, 214.

An extensible piston and cylinder assembly 292, 294 extends between each support arm 286, 288 and its respective side wall. The piston 296 of each assembly 292, 294 is pivotally connected to its respective support arm 286, 288 at respective pivot points 298 located above the support arm pivot axis 290. The cylinder 299 of each piston and cylinder assembly 292, 294 is pivotally connected to its respective bin side wall 212, 214 by a pivot bracket 300 located slightly above the piston pivot points 298. The pivot brackets 300 are located rearwardly of the support arm pivot axis 290.

Figure 13:
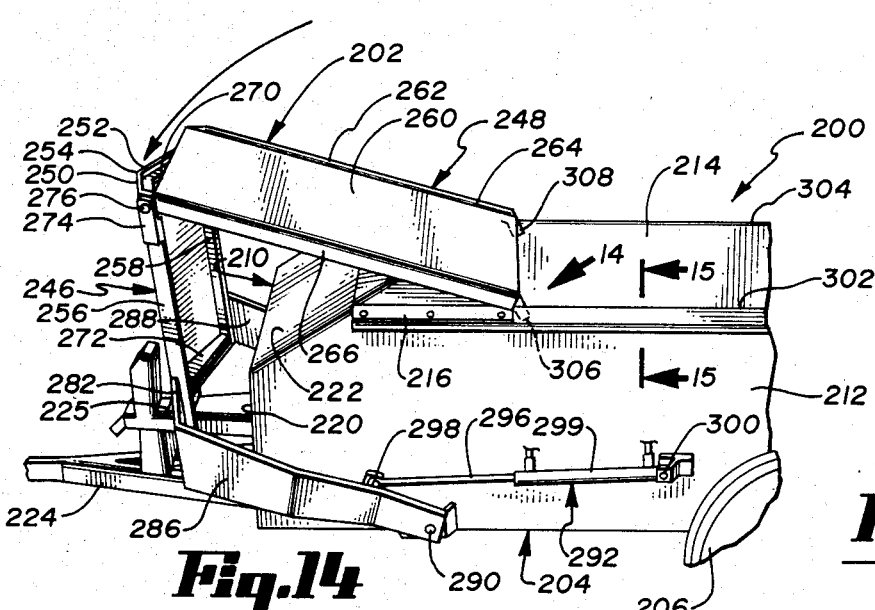
FIG. 13 is similar to FIG. 11, but with the shiftable cover in the fully open position.
Figure 14:
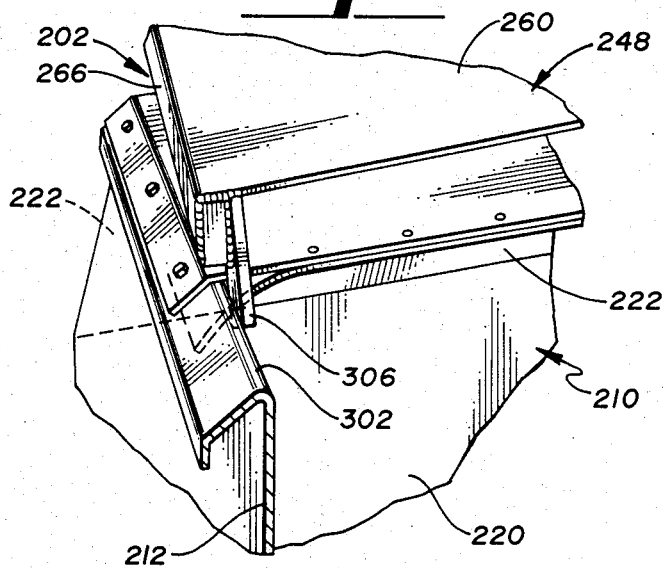
FIG. 14 is an enlarged, fragmentary, sectional view of the manure spreader side wall upper margin and the cover.
Figure 15:
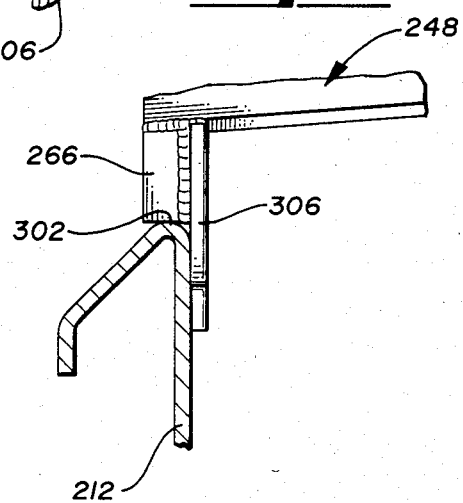
FIG. 15 is a fragmentary, sectional view taken along 15—15 of FIG. 13.

The front plate and rear plate lateral edges 256, 258, 266, 268 are positioned so as to be vertically aligned with the upper marginal edges 302, 304 of respective bin side walls 212, 214. Referring in particular to FIGS. 13, 14 and 15, guide struts 306, 308 depend downwardly from the trailing edge of rear plate 248 in guiding, abutable engagement with respective side walls 212, 214.

Rear gate 218 includes a top portion comprised of the beforementioned inclined sections 234, 236, 238 and downwardly extending rear panel 310. Rear panel 310 includes flexible seal 312. Extensible piston and cylinder assemblies 314, 316 extend between the rear gate 218 and side wall mounting brackets 318.

Operation of the side to side shiftable cover 22 will now be described.

The cover pin retaining brackets 62, 64, 70, 72 are uniquely designed to allow the manure spreader operator to quickly select the side to which the shiftable cover 22 will open. Referring to FIGS. 3 and 4, it will be seen that the retainer pins 124 are removably received within their respective sleeves 122 so as to selectively capture the cover pivot pins 58, 60, 66, 68 within the notches 120 of their respective retaining brackets 62, 64, 70, 72. For example, and referring to FIG. 2, the opening of the cover 22 to the right side of the manure spreader 20 is accomplished by inserting retainer pins 124 within the sleeves 122 of retaining brackets 58, 60, on the right side of the manure spreader 20. At the same time, retainer pins 124 received within sleeves 122 of retaining brackets 70, 72, on the left side of the vehicle, are removed. Still referring to FIG. 2, the cover 22 could quickly and easily be configured to open to the left of the manure spreader 20 by removing the pins 124 from the sleeves 122 of retaining brackets 62, 64, on the right hand side of the manure spreader 20, and, at the same time, inserting pins 124 into the sleeves 122 of the retaining brackets 70, 72 on the left hand side of the manure spreader 20, all done while the cover 22 is in the flat, closed position.

After selection of the side on which the cover 22 will be opened by insertion of pins 124 into the sleeves 122 of the appropriate retaining brackets, the cover 22 is opened by simultaneously extending the pistons 98 of the piston and cylinder assemblies 54, 56. In this regard, and referring to FIG. 7, it will be observed that the pivot points 102, 104 and the line A, drawn between the pivot point 106 and the attachment of pivot arm 94 to cover plate 52, are above a line drawn between front and rear hinges 86. Extension of the piston 98, therefore, creates a force vector B-2 upwardly, and a force vector B-1 downwardly, lifting the hingeable connection 86 between the cover plates 50, 52 upwardly. With the pivot pins 58, 60 retained by retaining brackets 62, 64, the left plate pivot pins 66, 68 will engageably slide across the top wall front and rear panels 34, 38 as the cover 22 is opened to the right side of the manure spreader 20. The sliding engagement of the pivot pins 66, 68 of plate 52 with the front and rear panels 34, 38, scrapes accumulated foreign matter from the panels.

The opening of the cover 22 will halt when the front and rear struts 110, 112 are forced into abutting engagement. The manure spreader 20 is now in a configuration for the direct top loading of manure into the manure spreader bin.

As noted above, the abutting engagement of struts 110, 112 prevents piston and cylinder assemblies 54, 56 and the force vector defined by the axis of the piston and cylinder assemblies, from going over center of the center hinges 86. Retraction of the pistons 98 into the cylinders 100 of the piston and cylinder assemblies 54, 56, therefore, presents a downward force vector to the hinges 86 thereby urging the cover 22 into the closed position. The scraping action of the plate pins 66, 68 along the surface of the panels 34, 36 again intends to clean foreign matter from the surface of the panels. It will be appreciated that, in any event, buildup of manure or other foreign matter along the top surfaces of the panels 34, 38 will not inhibit the closing of the cover 22, since the front and rear marginal edges of the cover plates 50, 52 are aligned inboard of the internal edges of the panels 34, 38. Moreover, the outboard lateral edges 82 of the cover plates 50, 52 are aligned inboard of the internally facing edges of side panels 40, 42 when the cover 22 is in the closed position, preventing the buildup of foreign matter on the side panels from inhibiting the complete closure of cover 22.

Operation of the fore and aft shiftable cover 202 will now be described.

Referring to FIG. 13, the cover 202 is shown in its fully closed position. In the fully closed position, the front and rear cover plate marginal edges 256, 258, 266, 268 rest upon and are supported by the upper marginal edges 302, 304 of the bin side walls 212, 214.

Referring again to FIG. 8, the piston and cylinder assembly 292 on side wall 212 (as well as piston and cylinder assembly 294 on side wall 214) are connected to their respective support arms 284, 286 at pivot points 298. Pivot points 298 are located above the line on respective sides drawn between pivot axis 290 and pivot bracket 300. Extension of the piston and cylinder assemblies 292, 294, therefore, urges the support arms 286, 288, and the attached front cover plate 246, upwardly and forwardly, as shown in FIG. 11. Referring to FIG. 11, it will be observed that the peripheries of bin front wall 210, and top wall front panel 216 fall within the radius enscribed by cover front plate 246 as it is moved forwardly.

Referring to FIG. 13, the leading edge of cover front plate 246 abutably engages resilient pad 225 of hitch 224 when the cover 202 is in its fully opened position.

The forward movement of cover front plate pivot points 276, 278 pulls the rear plate 248 forwardly. It will be appreciated that, as the cover 202 is shifted forwardly, the lower lateral edges of the front and rear cover plates are lifted upwardly away from the upper marginal edges of side walls 212, 214. The trailing edge of rear cover plate 248, however, slidingly engages the side wall upper marginal edges 302, 304. Foreign matter is thereby scraped from the side wall edges 302, 304 and is prevented from accumulating and interfering with the complete closure of the cover 202. The rear cover plate 248 is maintained in alignment with the bin side wall edges 302, 304 by the guiding engagement of guide struts 306, 308 with the side walls 212, 214. The guide struts 306, 308 prevent movement of the cover plates in directions transverse to their normal, generally linear, fore and aft paths of travel.

The resting engagement of the front cover plate 246, with the pad 225 on hitch 224 prevents the pivot attachment points 298 of the piston and cylinder assemblies 292, 294 to the support arms 286, 288 from going over center of the lines defined by the pivot brackets 300 and pivot axis 290. Retraction of the piston and cylinder assemblies 292, 294, therefore, urges the support arms 286, 288 upwardly and rearwardly, urging the cover 202 into its closed position.

The chevron shape of the front and rear cover plates 246, 248 helps to maintain the cover 202 in its closed position. That is to say, when the cover 202 is in its closed position, the abutting engagement of the cover plates 246, 248 at a point above the pivot axis defined by pivot points 276, 278 prevents the upward movement of rear plate 248 about the pivot points 276, 278. Moreover, guide struts 306, 308 engage the underside of rear gate 218, also holding the rear plate 248 secure. The trailing edge of rear plate 248 may advantageously be beveled for the same reason, i.e., to allow the rear plate 248 to engage the underside of rear gate 218 when the cover 202 is in the closed position.

I claim:

1. A shiftable cover for a farm implement or the like having structure defining an opening with a peripheral edge having opposed sides, including:

a first plate covering a portion of said opening;

a second plate for covering an additional portion of said opening;

means for hingeably, operably coupling said first and second plate along a pivot axis;

means operably coupled with said first and second plates for pivotally shifting said first and second plates relative to each other about said pivot axis whereby said plates are selectively shifted between a first position substantially covering said opening and a second position wherein said opening is exposed;

pivot means mounted to said first and second plates adjacent the opposite sides of said opening;

pivot restraining means mounted on said sides and selectively engagable with said pivot means;

said pivot means of one of said plates maintaining operable engagement with said opening peripheral edge while said plates are shifted between said first and second positions, whereby said opening peripheral edge is scrapingly cleaned by the operable engagement of said pivot means with said edge.

2. A shiftable cover for a farm implement as claimed in claim 1, said pivot means comprising pivot pins extending outwardly from said plates in generally parallel orientation with said opening sides, said pivot engaging means comprising bracket means operably coupled to said opening edges.

3. A shiftable cover for a farm implement as claimed in claim 2, said bracket means comprising structure defining a pivot pin receiving notch and a retainer pin receivable within said notch defining structure for retaining said pivot pin within said notch.

4. A shiftable cover as claimed in claim 1, said means for operably shifting comprising extensible motive means defining a force pivot point offset above said pivot axis, said cover including means for limiting the shifting of said plates beyond said second position whereby said extensible motive means force vector is prevented from passing over center of said pivot axis.

5. A shiftable cover as claimed in claim 4, said limiting means including means operably coupled to said first and second plates, and aligned for mutual, abutting engagement when said plates are in said second position.

6. A shiftable cover as claimed in claim 5, said abutting means comprising a first strut depending from said first plate and a second strut depending from said second plate, said struts aligned for mutual abutting engagement when said plates are in said second position.

* * * * *